(12) United States Patent
Elsen (10) Patent No.: US 7,785,043 B2
(45) Date of Patent: Aug. 31, 2010

(54) APPARATUS FOR CONTROLLING OR REGULATING THE DISTRIBUTION OF PARTICLES IN DUST OR GRANULE FORM IN ONE OR A PLURALITY OF CARRIER GAS STREAMS

(76) Inventor: Guido Gerhard Ulf Elsen, Altdorfstrasse 48, D-79312 Emmendingen (DE)

( * ) Notice: Subject to any disclaimer, the term of this patent is extended or adjusted under 35 U.S.C. 154(b) by 128 days.

(21) Appl. No.: 11/947,134

(22) Filed: Nov. 29, 2007

(65) Prior Publication Data
US 2008/0202393 A1    Aug. 28, 2008

(51) Int. Cl.
B65G 53/66    (2006.01)
(52) U.S. Cl. .................. 406/12; 406/181; 406/183; 406/195; 251/212
(58) Field of Classification Search .................. 406/12, 406/19, 181–183, 191, 192, 195; 138/44, 138/45, 46; 251/212
See application file for complete search history.

(56) References Cited

U.S. PATENT DOCUMENTS

| 1,816,223 | A | * | 7/1931 | Jackson | 406/12 |
| 2,180,622 | A | * | 11/1939 | Vincent | 138/46 |
| 4,300,749 | A | * | 11/1981 | Ferro et al. | 251/124 |
| 4,459,922 | A | * | 7/1984 | Chadshay | 110/265 |
| 4,993,886 | A | * | 2/1991 | Hofstetter | 406/192 |
| 5,593,131 | A | * | 1/1997 | Briggs et al. | 251/117 |
| 5,685,240 | A | * | 11/1997 | Briggs et al. | 110/106 |
| 6,799,525 | B2 | * | 10/2004 | Manos et al. | 110/106 |
| 2005/0042043 | A1 | * | 2/2005 | Levy et al. | 406/181 |

* cited by examiner

Primary Examiner—Gene Crawford
Assistant Examiner—William R Harp
(74) Attorney, Agent, or Firm—Antonelli, Terry, Stout & Kraus, LLP.

(57) ABSTRACT

The invention relates to an apparatus for controlling the distribution of particles in dust or granule form in one or a plurality of carrier gas streams. The invention further relates to the use of an apparatus in a conveying pipe. An advantageous adaptation of the volumetric flow within the individual flow cross sections is achieved with the invention, so that in particular no channeling can occur, which has favorable effects for a specified material flow rate or material flow rate control particularly in coal-fired power plants. The apparatus according to the invention is furthermore very simple in construction and requires few components.

12 Claims, 12 Drawing Sheets

APPARATUS FOR CONTROLLING OR REGULATING THE DISTRIBUTION OF PARTICLES IN DUST OR GRANULE FORM IN ONE OR A PLURALITY OF CARRIER GAS STREAMS

BACKGROUND OF THE INVENTION

The invention relates to an apparatus for controlling the distribution of particles in dust or granule form in one or a plurality of carrier gas streams.

The invention further relates to the use of an apparatus in a conveying pipe.

Particles in dust or granule form are often conveyed to suitable consumers such as coal dust burners, extruders, bunkers or the like by the introduction of suitable transporting gases such as air or inert gases. This kind of conveyance is especially important in coal-fired power plants because the coal, ground to roughly the fineness of dust, is transported from the coal pulverizer to the burners in question with the aid of heated carrying air. Here it should be noted that the burners in question are supplied with as nearly as possible equal quantitative contents of fuel (coal dust) per unit time. This is not so simple to achieve because, for example, up to ten pipelines can be connected to one coal pulverizer, each of which pipelines must be provided with equal mass flow rates of fuel and carrying air. The gate valves currently used do not make this completely possible.

It is an object of the invention to create an apparatus according to the above-stated background that avoids the disadvantages of the prior art using simple means.

It is a further object of the invention to furnish an advantageous use for such an apparatus.

SUMMARY OF THE INVENTION

The apparatus according to the invention exhibits two or a plurality of shutoff elements in the form of partial rings, adapted to the inner contour of the relevant conveying pipe, which shutoff elements influence the effective cross section of the conveying pipe in such fashion that the changes in flow cross section brought about thereby and the resulting frictional inequalities lead to pressure inequalities in the relevant conduit fashioned as a conveying pipe. These pressure inequalities in turn influence the mass throughput and can both increase and decrease it. In the favorable, that is, optimal, angular positions of the several relevant shutoff elements, accordingly, the relevant carrier gas stream, with the particles in dust or granule form, is controlled or regulated in the desired fashion and for example held constant within specified limiting values. By profiling the individual shutoff elements, for example, so-called channeling can be avoided and existing channels can even be disintegrated or disrupted. It is conceivable to pivot the several shutoff elements into pivoted positions unequal to one another within the relevant conveying pipe and also to immobilize each of them in the desired angular position relative to the longitudinal axis of the relevant conveying pipe, which can be effected from a distant control panel via remote control. The cross-sectional profiles of the individual shutoff organs can also be selected or varied in correspondence with the respective operating conditions. Here a wing profile, as is known from aircraft, is conceivable. This has for example the advantage that the conveyed particles are not pressed against the respective pipeline walls and there damaged by friction. By virtue of the very simple construction according to the invention, which requires few components, maintenance or repair is possible in relatively quick fashion with no major halt in operation, because for example the individual shutoff elements can be replaced without difficulty, which substantially increases the operational reliability of the entire system, for example in coal-fired power plants. Unlike materials or coatings can also be employed for the shutoff elements and their surfaces in order to accommodate the process conditions in question, which can be advantageous for example for the conveyance of additives or the like in the food industry.

What is more, the chosen design ensures a high degree of safety against leaks, because parts that are for example highly rotationally symmetrical can be used to support the individual shutoff elements. These shutoff elements can be actuated and immobilized by suitable motor drives, for example by remote control or remote regulation. It is also, however, possible to actuate them manually in a particular case.

In one embodiment, the individual shutoff elements in one pivoted position can have their outer periphery clearance-tight against the inner wall of the relevant conveying pipe but delimiting between them a tubular free conveying cross section or lying one flat on the other.

It is particularly advantageous if the shutoff elements are continuously pivotable and also can be immobilized in the pivoted position in question.

In another embodiment, the shutoff elements are fashioned in the shape of a circular ring at both their outer periphery and also their inner periphery. Thus, when they are in a position wherein they have their outer periphery against the inner side of the relevant conveying pipe, the shutoff elements complement each other to form practically circular rings.

In contrast, in another embodiment, the shutoff elements are circular in shape at their outer enveloping surface and are polygonal in shape at their inner enveloping surface facing toward the longitudinal axis of the relevant conveying pipe. This can be advantageous for example in order to prevent roping when coal dust or the like is being conveyed, or to break up or disrupt channels already formed.

In embodiment, shutoff devices offset by an angle are disposed one behind another, preferably spaced apart axially. These shutoff devices according to the above-described embodiments can in each case be of the same or different designs. For example, one device can comprise shutoff elements of circular ring design while the device disposed at an angle either therebehind or therebefore in the axial direction of the relevant conveying pipe exhibits, at the outer enveloping surface, shutoff elements of circular design that have a shape adapted to the conveying pipe, while the shutoff elements are fashioned in polygonal form or otherwise serrated or wavy at their inner enveloping surface facing toward the longitudinal axis of the relevant conveying pipe, depending on the desired operating conditions.

Two shutoff organs may be disposed in the axial direction and offset by 90° relative to one another.

The shutoff elements are preferably driven by motor means, with an intervening gearbox if appropriate. In this way the entire apparatus can be incorporated into a process control or process regulating system and can for example be computer-controlled from a central control panel.

In another embodiment, the shutoff elements exhibit in cross section an airfoil shape after the fashion of aircraft wings. This means that the shutoff elements are fashioned as convex, for example on one side, the side facing toward the carrier gas stream, and correspondingly concave on the underside, similarly to what is known from fixed-wing aircraft in subsonic flight.

In embodiment, the pivoted position and thus the angle of attack of the shutoff elements relative to the carrier gas stream is controlled or regulated in accordance with the distribution of dust particles or granules as viewed over the cross section of the relevant conveying pipe.

The apparatus may be used in particular in the conveyance of coal ground to the fineness of dust, which is conveyed from a coal pulverizer, or for the conveyance of food components or granular materials or the like.

BRIEF DESCRIPTION OF THE DRAWINGS

The invention is illustrated, in part schematically, for a plurality of exemplary embodiments with reference to the Drawings, in which.

DETAILED DESCRIPTION OF THE INVENTION

Figure 1:
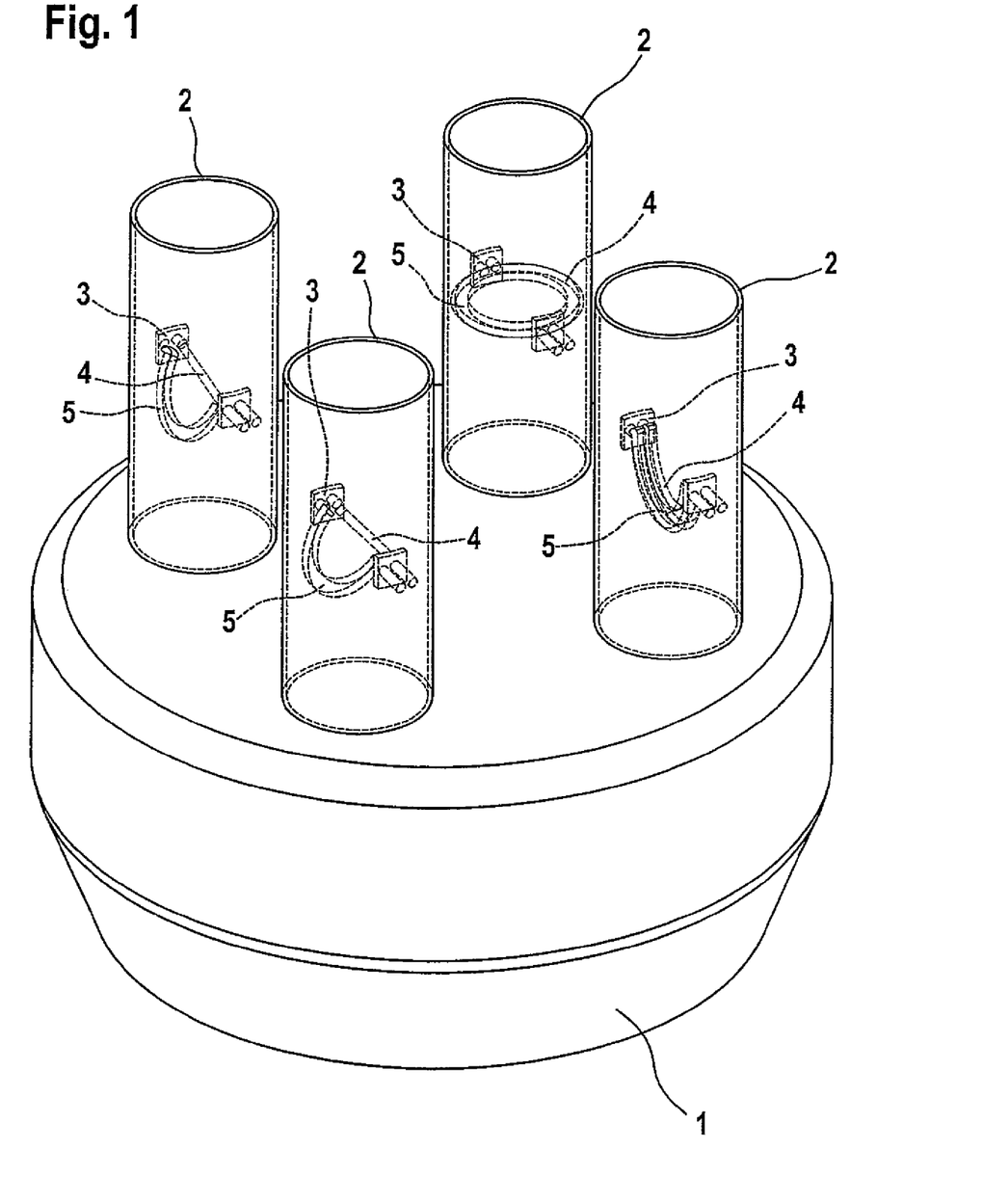
FIG. 1 depicts, in perspective representation and in part in cutaway fashion, a coal pulverizer having four conveying pipes and shutoff organs disposed therein, which shutoff organs have been placed in various positions.
Figure 2:
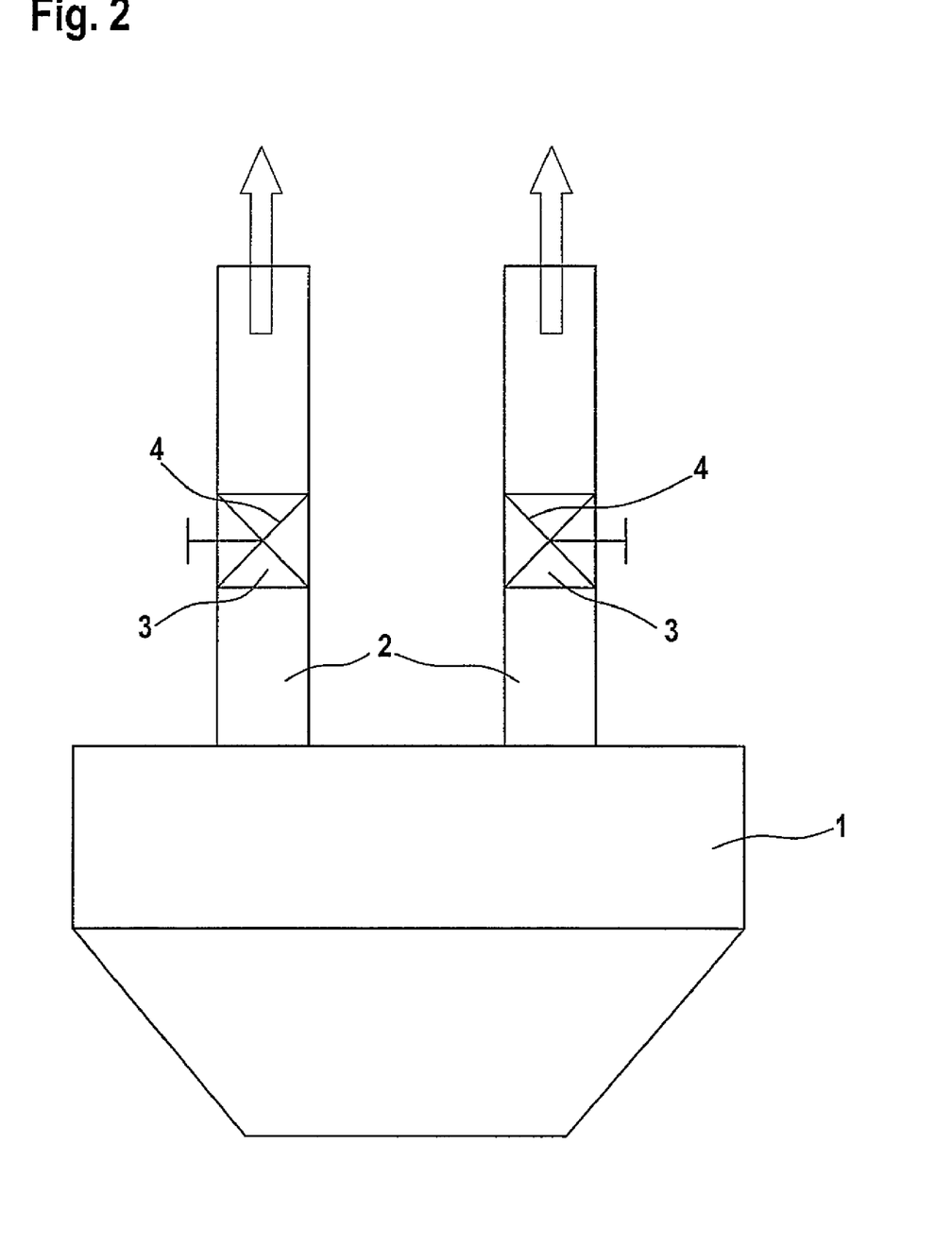
FIG. 2 is an illustration similar to FIG. 1.
Figure 3:
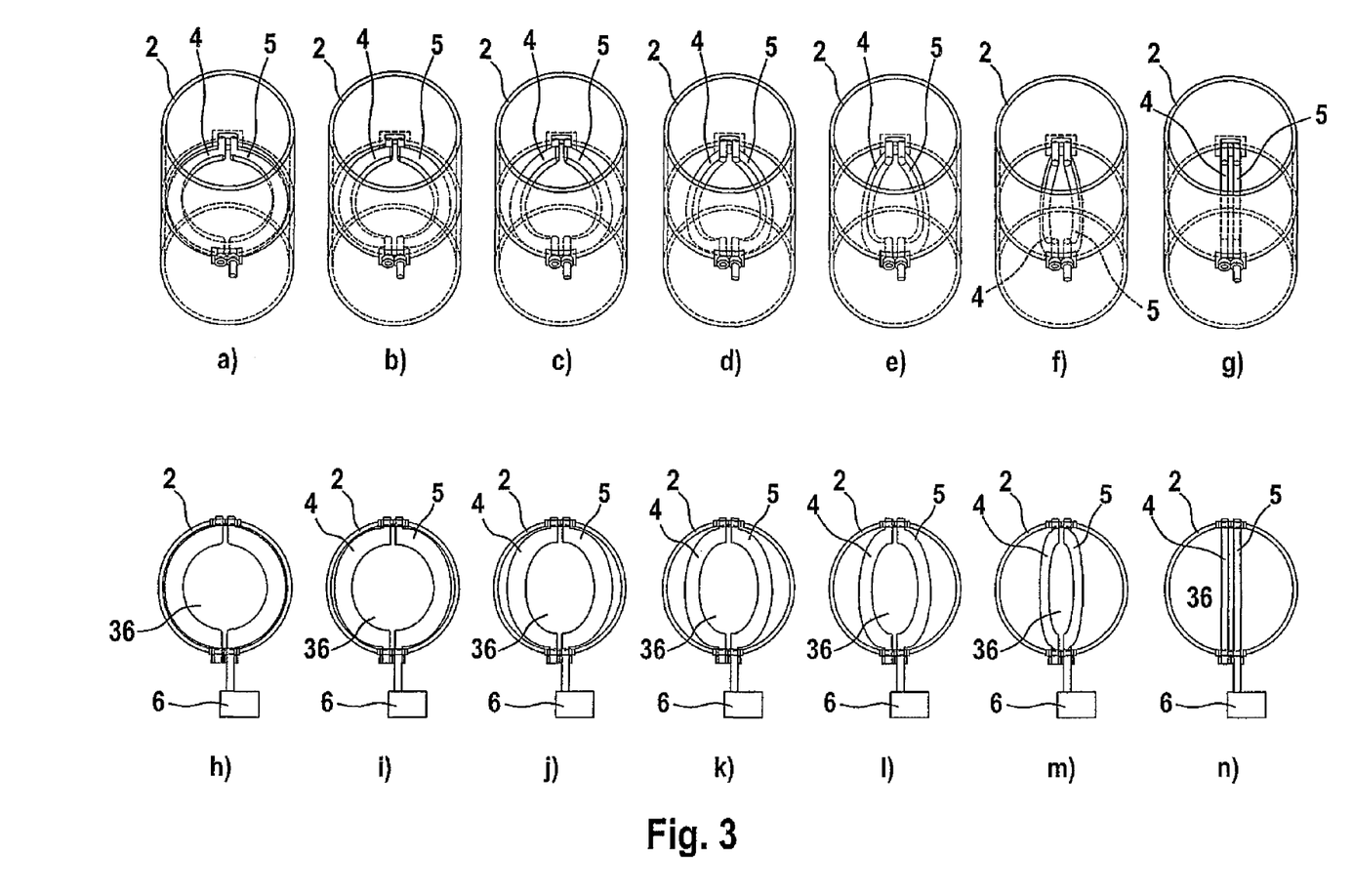
FIGS. 3a to 3n depict shutoff elements in various angular positions in a conveying pipe.

In FIG. 1, the reference character 1 identifies a coal pulverizer from which four conveying pipes 2, circular in cross section, lead away to suitable consumers, for example to coal burners (not illustrated). In coal pulverizer 1 coal is reduced in size and conveyed on to the coal burners by a suitable stream of carrier gas, generally preheated air. These coal burners must be supplied with as nearly as possible equal quantities of coal per unit time. The control or regulation of the individual conveying streams in conveying pipes 2 is effected by at least one apparatus 3. As can be seen from the illustration in FIG. 2, the actual condition in the left-hand conveying pipe, for example, can be such that in the assumed example only 30% coal dust is being conveyed per unit time, while the nominal condition is supposed to be 50%, while for example in right-hand line 2 the instantaneous mass throughput is 70% while the nominal condition likewise should be 50%, that is, as in the left-hand line. A similar statement can also hold for the four lines in FIG. 1.

Figure 16:
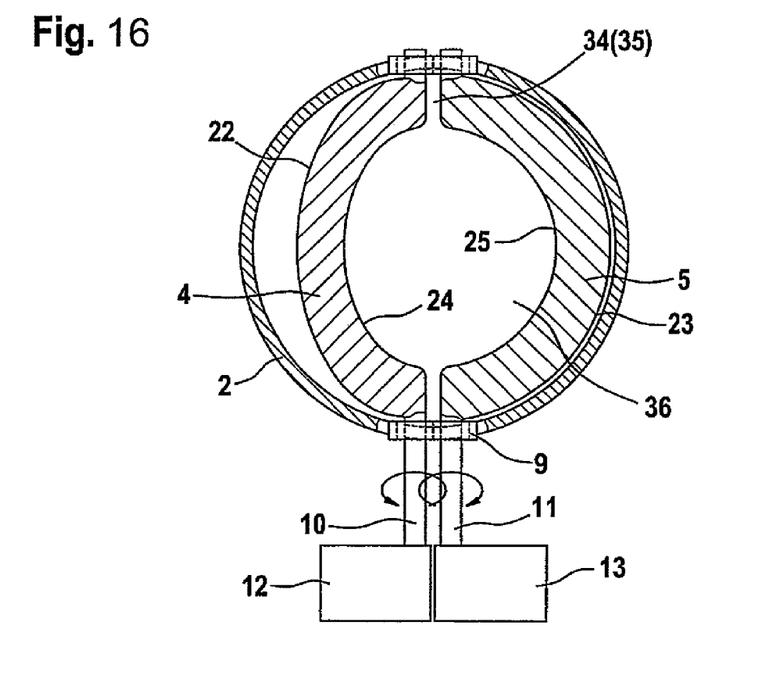
FIG. 16 depicts a further embodiment of the invention having shutoff elements illustrated in unequal pivoted positions.
Figure 17:
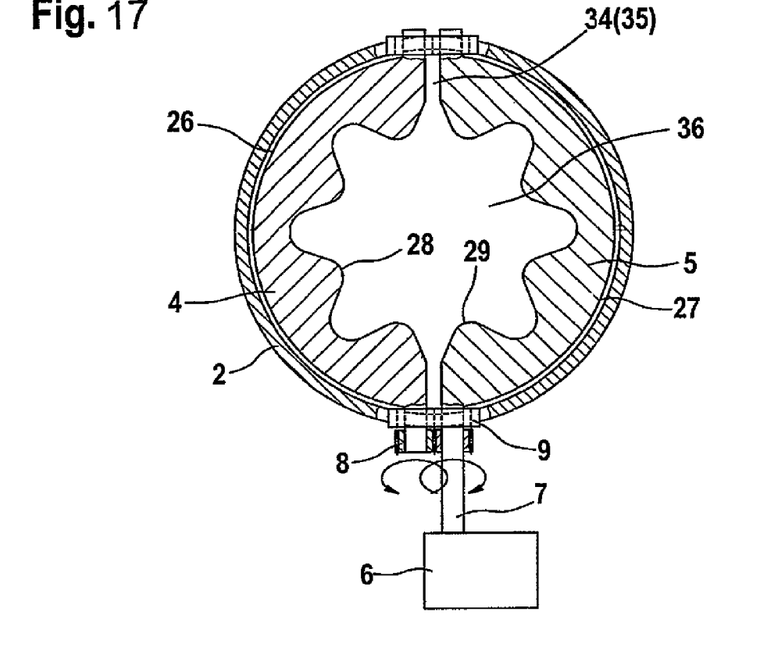
FIG. 17 depicts a further embodiment of the invention.
Figure 18:
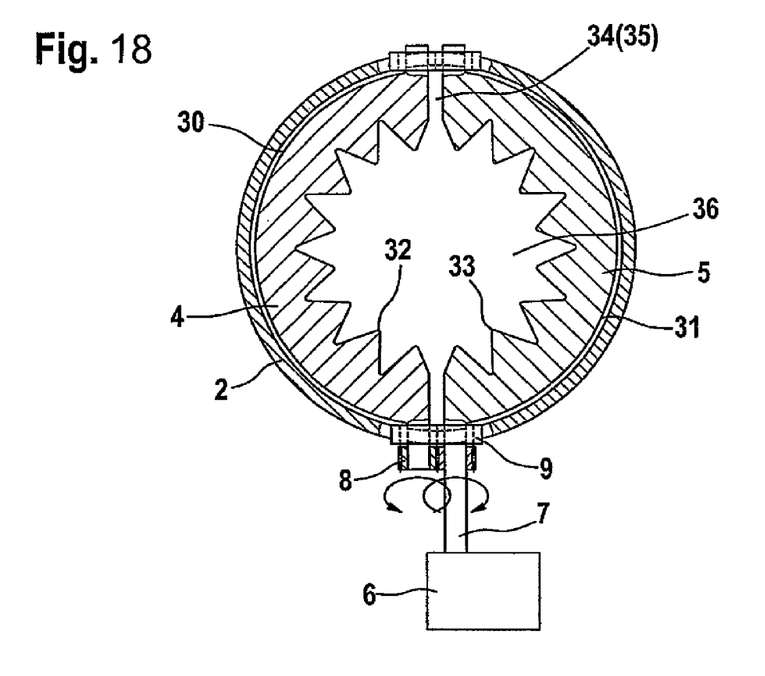
FIG. 18 again depicts a further embodiment of the invention.

In each of the embodiments that can be seen in FIGS. 1 to 17 as well as FIG. 17 and FIG. 18, apparatus 3 comprises two shutoff elements 4 and 5, which can be controlled or regulated manually or by at least one remotely regulated or remotely controlled motor drive 6, synchronously simultaneously but in opposite directions, or individually, into unequal angular positions relative to the longitudinal axis of relevant conveying pipe 2, and can also be immobilized in the desired pivoted position in each case. Motor drive 6 can in each case be effected via a shaft 7 and gearing 8. The reference character 9 identifies a bearing for the shaft.

In the embodiment of FIG. 16, there are two shafts 10 and 11 and two motor drives 12 and 13, which can be driven or regulated unequally in order to pivot shutoff elements 4 and 5 either jointly or individually into equal or unequal angular positions relative to the longitudinal axis of relevant conveying pipe 2 and also to immobilize them in the desired pivoted position in each case (FIG. 16).

Figure 14:
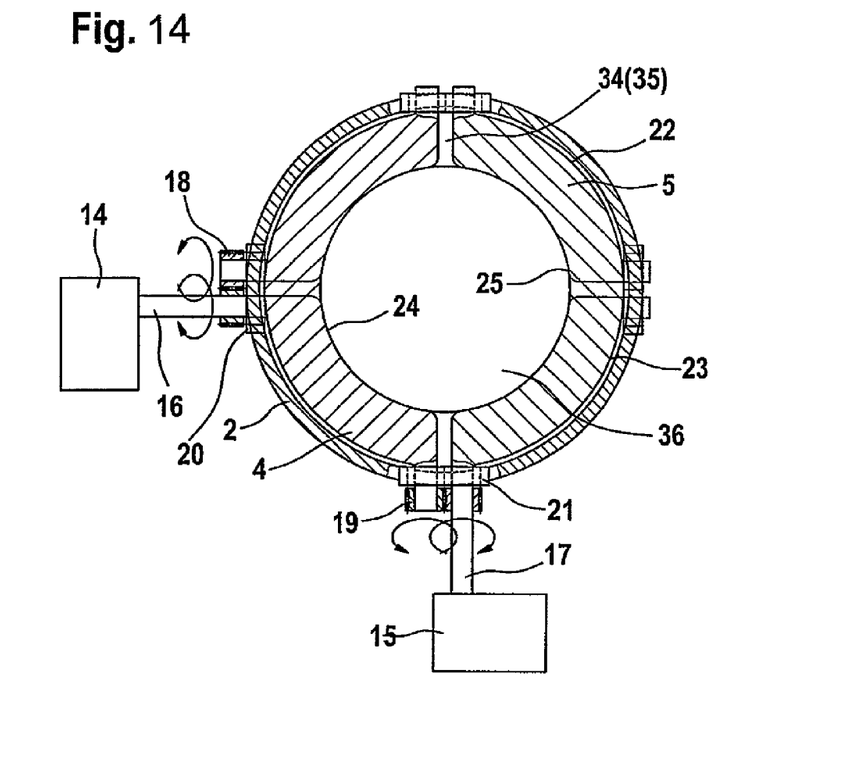
FIG. 14 depicts a further embodiment of the invention, there being two devices disposed one behind another in the axial direction of the conveying pipe and offset by 90° relative to one another, the upper and lower shutoff elements—as viewed in the drawing plane—having been illustrated as not pivoted/inclined relative to one another.
Figure 15:
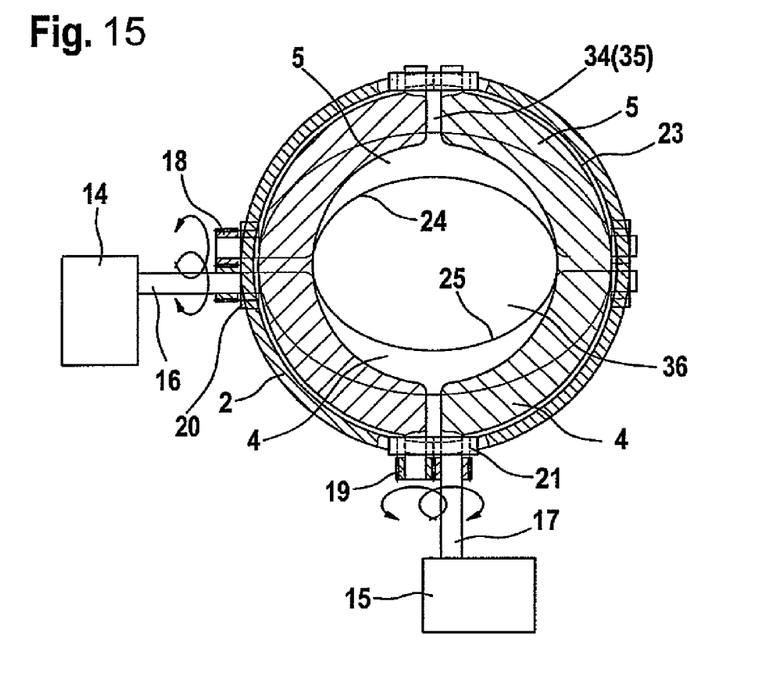
FIG. 15 depicts the embodiment that can be seen in FIG. 14, the lower shutoff element having been illustrated as not inclined and the upper shutoff element as inclined by 45° relative to the longitudinal axis of the conveying pipe.

In the embodiment of FIGS. 14 and 15 there are two apparatuses 3 disposed one behind or above another in the longitudinal axis direction (as viewed in the drawing plane), each having two shutoff elements 4, 5 that are each pivoted by a motor drive 14, 15 via a shaft 16, 17 and driven by motor means in the pivoted/inclined position desired in each case relative to the longitudinal axis of conveying pipe 2. Associated with each shaft 16, 17 is gearing 18, 19 with bearing 20, 21 for the associated shaft 16, 17. Motor drives 14, 15 can be controlled or regulated from a remote control position, not illustrated, with reference to the mass throughput in each case.

In FIGS. 3a to 3n it can be seen for example how the two shutoff elements 4 and 5 have been synchronously and oppositely pivoted into various pivoted positions. Here FIG. 3a depicts the position in which the two shutoff elements 4 and 5 lie in clearance-tight fashion against the inner side of the circular inner enveloping surface of relevant conveying pipe 2, while with reference to FIGS. 3b to 3n they are pivoted more and more relative to one another until in FIG. 3n they have been pivoted parallel to one another and parallel to the longitudinal axis of relevant conveying pipe 2 with a clearance space. In this position, contrary to what is illustrated in the Drawings, they can also lie one against another flatly and without a clearance.

In FIG. 14, similarly to what is shown in FIG. 3a, shutoff elements 4 and 5 are disposed with a flap inclination of 0°. In the assumed exemplary embodiment, the total air flow cross section=211100 mm² (≈100%), the free air flow cross section=113659 mm² (≈53.84%) and the obstructed air flow cross section=97441 mm² (≈46.16%).

Figure 8:
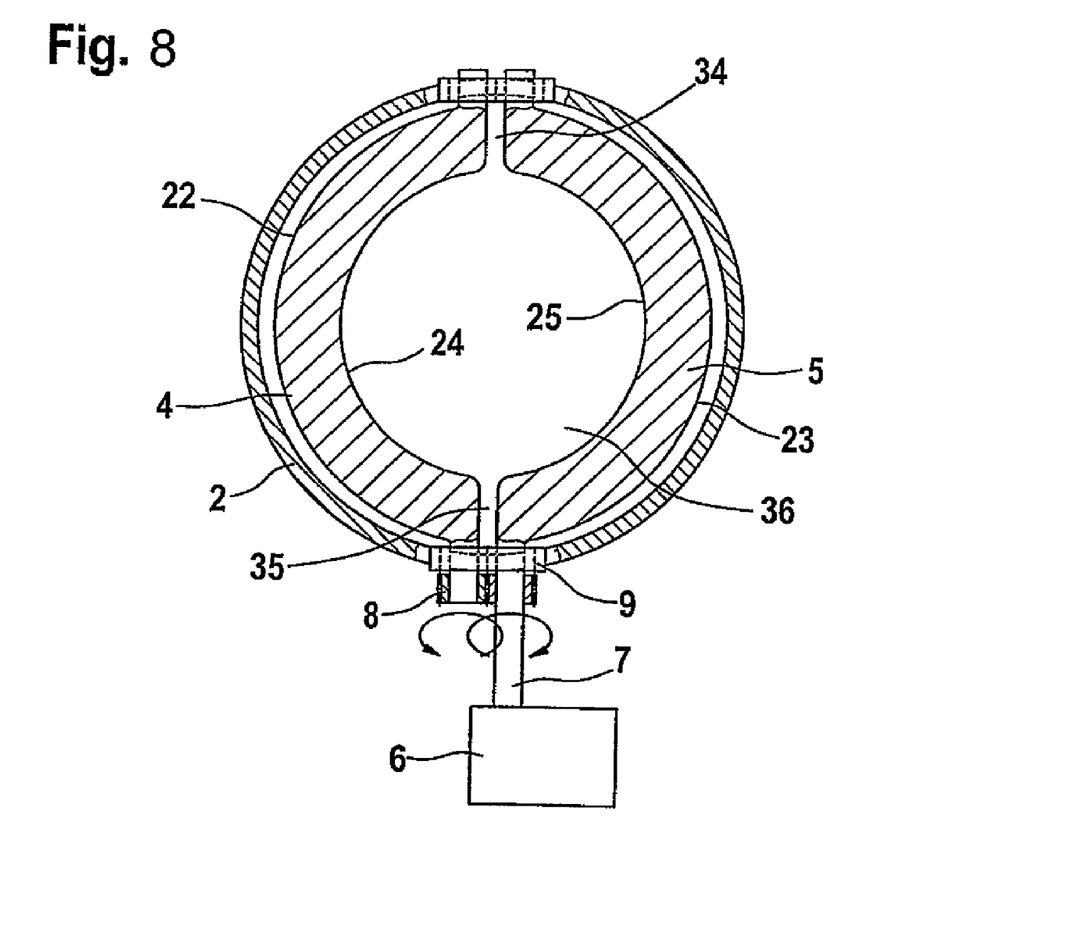
FIG. 8 depicts the embodiment that can be seen in FIG. 4, the shutoff elements, however, having been synchronously and oppositely pivoted through 15° relative to the longitudinal axis of the conveying pipe.

In FIG. 8, shutoff elements 4 and 5 are pivoted by 15° relative to the longitudinal axis of conveying pipe 2. In the assumed exemplary embodiment, the total air flow cross section=211100 mm² (≈100%), the free air flow cross section=116130 mm² (≈55.01%) and the obstructed air flow cross section=94970 mm² (≈44.99%).

Figure 9:
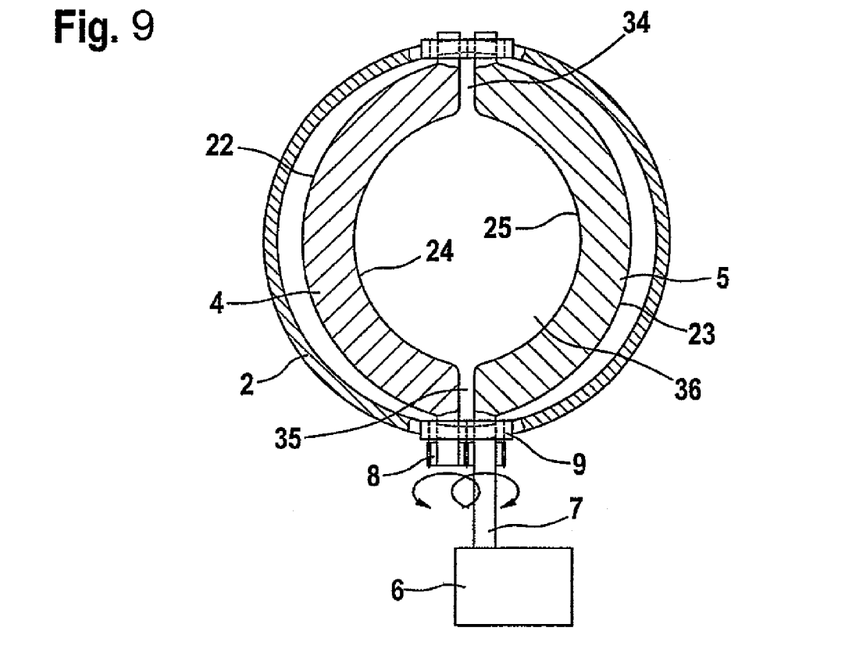
FIG. 9 depicts the embodiment that can be seen in FIG. 4, the shutoff elements having been synchronously and oppositely pivoted through 30° relative to the longitudinal axis of the conveying pipe.

In FIG. 9, shutoff elements 4 and 5 are pivoted by 30° relative to the longitudinal axis of conveying pipe 2. In the assumed exemplary embodiment, the total air flow cross section=211100 mm² (≈100%), the free air flow cross section=123333 mm² (≈58.42%) and the obstructed air flow cross section=87767 mm² (≈41.58%).

Figure 10:
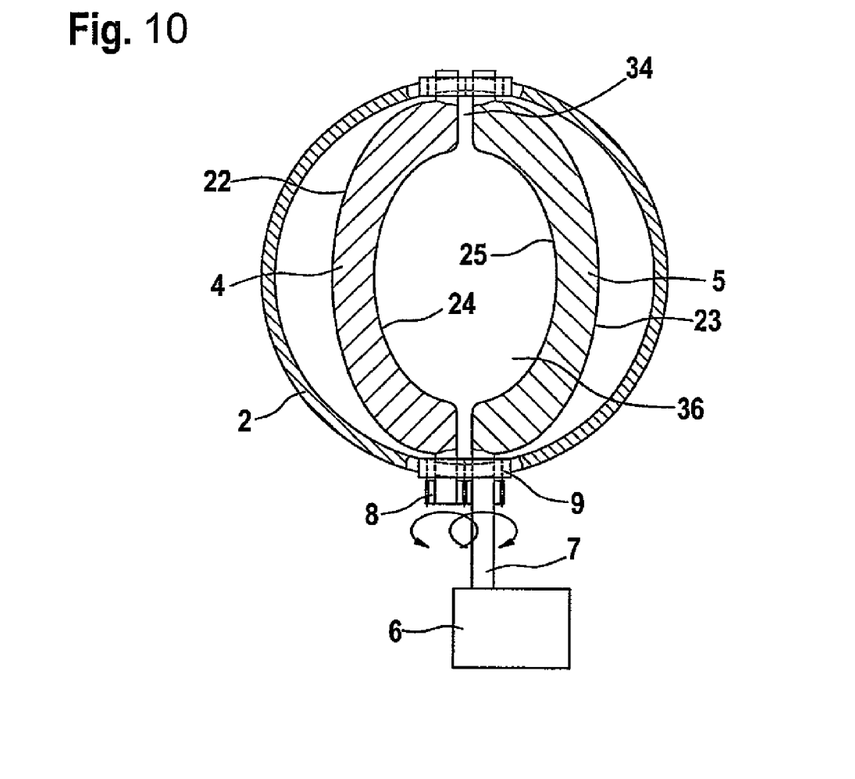
FIG. 10 depicts the embodiment that can be seen in FIG. 4, the shutoff elements having been synchronously and oppositely pivoted through 45° relative to the longitudinal axis of the conveying pipe.

In FIG. 10, shutoff elements 4 and 5 are pivoted by 45° relative to the longitudinal axis of conveying pipe 2. In the assumed exemplary embodiment, the total air flow cross section=211100 mm² (≈100%), the free air flow cross section=134655 mm² (≈63.79%) and the obstructed airflow cross section=76445 mm² (≈36.21%).

Figure 11:
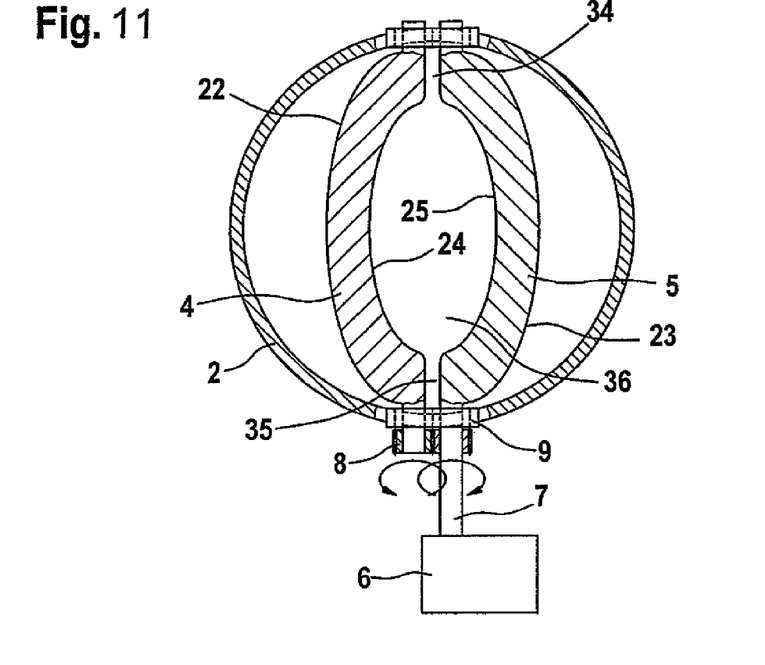
FIG. 11 depicts the embodiment that can be seen in FIG. 4, the shutoff elements having been synchronously and oppositely pivoted through 60° relative to the longitudinal axis of the conveying pipe.

In FIG. 11, shutoff elements 4 and 5 are pivoted by 60° relative to the longitudinal axis of conveying pipe 2. In the assumed exemplary embodiment, the total air flow cross section=211100 mm² (≈100%), the free air flow cross section=149081 mm² (≈70.62%) and the obstructed air flow cross section=62019 mm² (≈29.38%).

Figure 12:
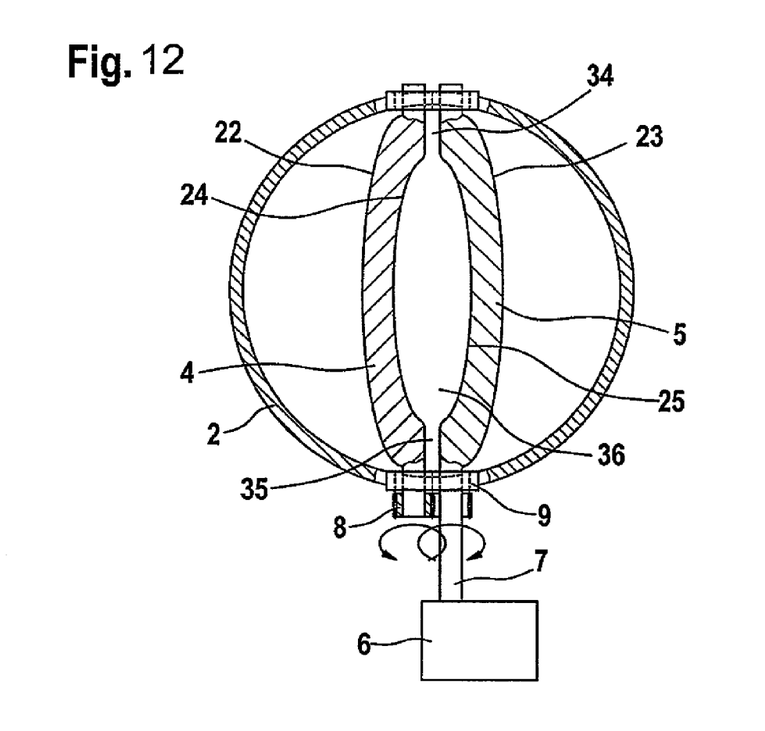
FIG. 12 depicts the embodiment that can be seen in FIG. 4, the shutoff elements having been synchronously and oppositely pivoted through 75° relative to the longitudinal axis of the conveying pipe.

In FIG. 12, shutoff elements 4 and 5 are pivoted by 75° relative to the longitudinal axis of conveying pipe 2. In the assumed exemplary embodiment, the total air flow cross section=211100 mm² (≈100%), the free air flow cross section=165154 mm² (≈78.25%) and the obstructed air flow cross section=45946 mm² (≈21.75%).

Figure 13:
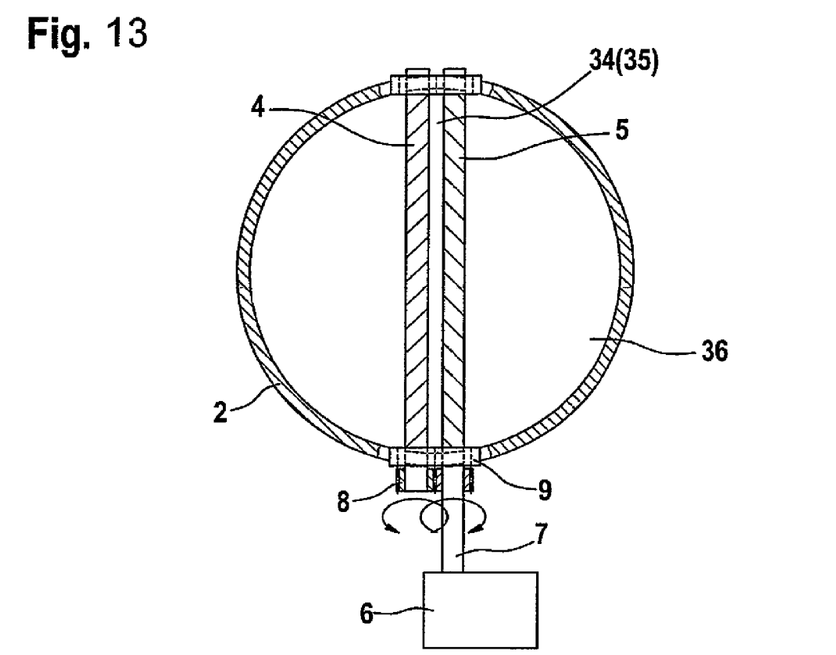
FIG. 13 depicts the embodiment that can be seen in FIG. 4, the shutoff elements having been synchronously and oppositely pivoted through 90° relative to the longitudinal axis of the conveying pipe.

In FIG. 13, shutoff elements 4 and 5 are pivoted by 90° relative to the longitudinal axis of conveying pipe 2. In the assumed exemplary embodiment, the total air flow cross section=211100 mm² (≈100%), the free air flow cross section=180815 mm² (≈85.65%) and the obstructed air flow cross section=30285 mm² (≈14.35%). This position therefore corresponds to what is illustrated in FIG. 3n.

Figure 4:
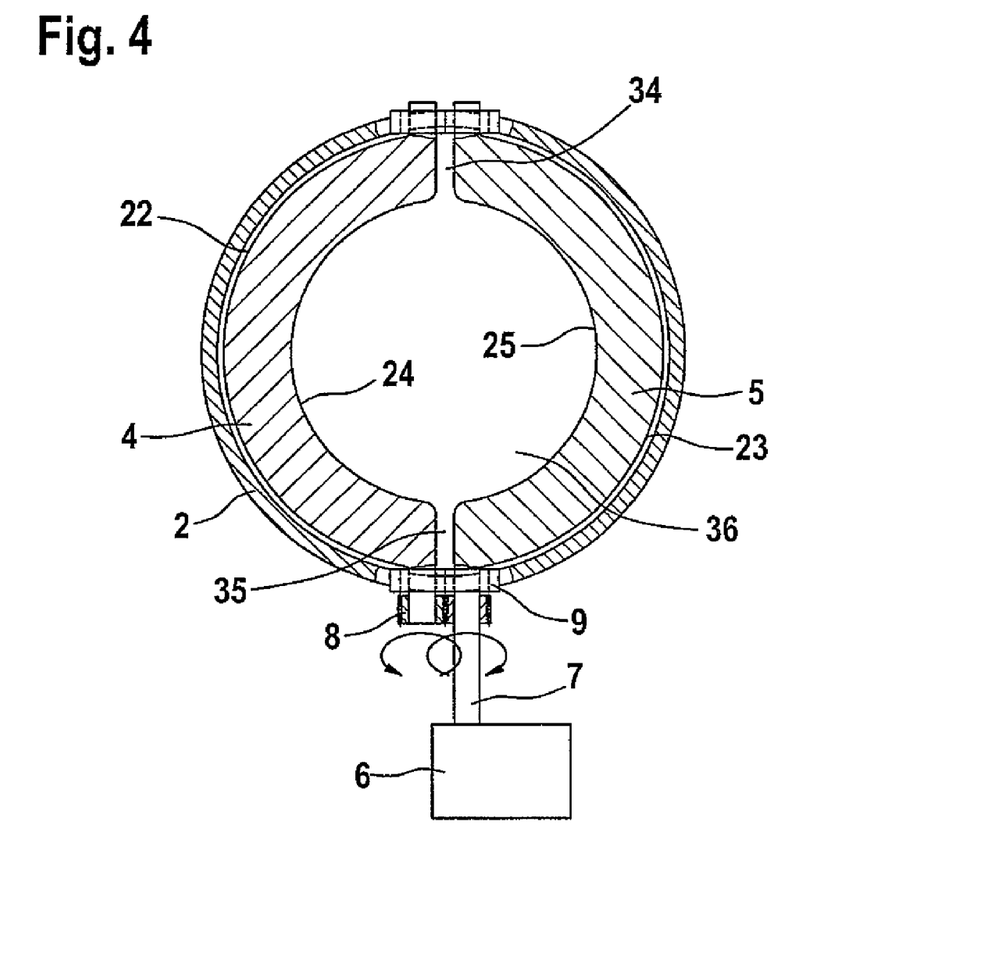
FIG. 4 is a cross section through a conveying pipe having a shutoff organ pivotable by motor means and gearing with a flap inclination of 0° relative to the longitudinal axis of the relevant conveying pipe.
Figure 5:
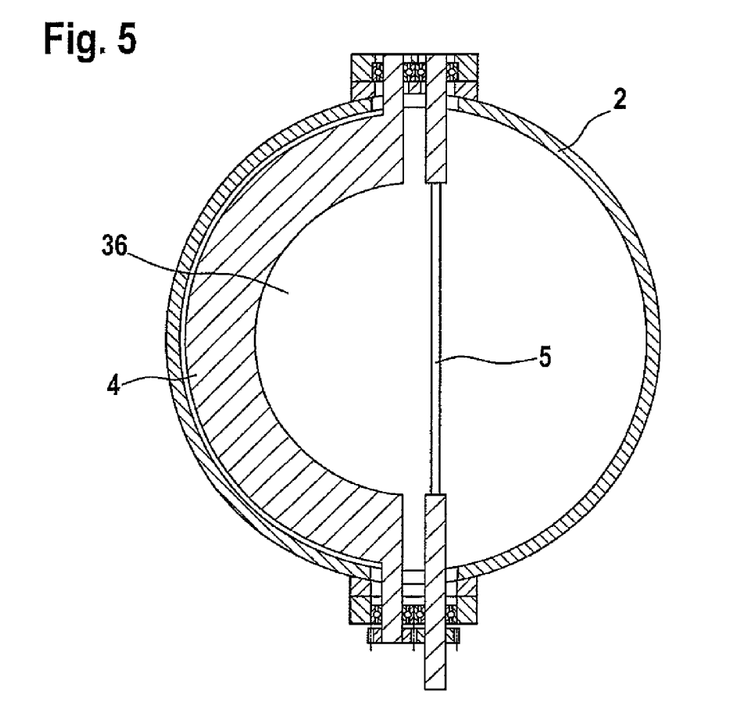
FIG. 5 depicts a further embodiment, likewise in a cross section through a conveying pipe.
Figure 6:
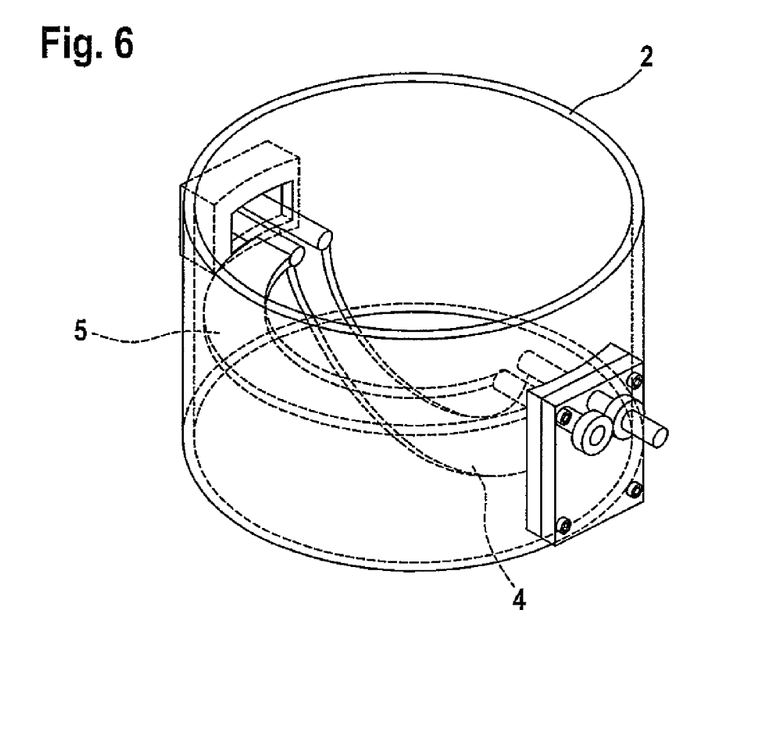
FIG. 6 is a perspective representation of FIG. 5.
Figure 7:
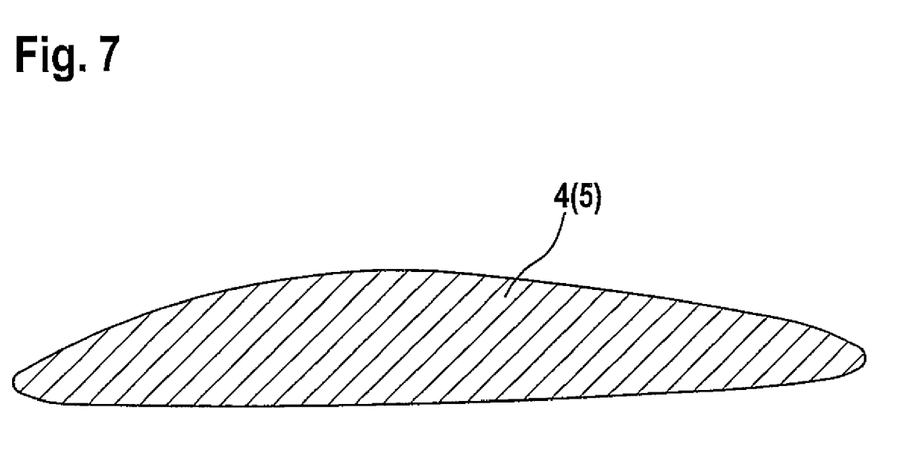
FIG. 7 is a cross section through a shutoff element fashioned as an airfoil according to the invention.

In the embodiment of FIG. 18, shutoff elements 4 and 5 disposed one behind another are each pivoted, as in FIG. 3a and FIG. 4, to an inclination of 0° relative to the longitudinal axis of conveying pipe 2, while in FIG. 15 the upper pair (in the drawing plane) of shutoff elements 4 and 5 are illustrated as inclined by 45° in opposite senses relative to the longitudinal axis of conveying pipe 2, and the lower pair (in the drawing plane) of shutoff elements 4 and 5 have been illustrated as not inclined, similarly to what is shown in FIG. 3a and FIG. 4.

In FIG. 16 one shutoff element 4 has been pivoted by 45° while shutoff element 5 has not been pivoted relative to the longitudinal axis of conveying pipe 2.

In all the embodiments of FIGS. 1 to 16, the shutoff elements are shown as circular at their outer periphery 22 and 23, respectively, and at their inner periphery 24 and 25 in each case, so that shutoff elements 4, 5 correspond to parts of a circular ring. Conveying pipes 2 are also circular in shape at their inner enveloping surface. If, however, the inner cross sections should be differently shaped, shutoff elements 4, 5 can be given a corresponding shape at their outer periphery.

The embodiment in FIG. 17 and FIG. 18 differs from the above-described embodiments in that, in the embodiment according to FIG. 17, shutoff elements 4 and 5 are fashioned as circular at outer periphery 26 and 27, respectively, and are fashioned roughly in the shape of a gently rounded star at inner side 28 and 29, respectively. In the embodiment according to FIG. 18, shutoff elements 4 and 5 are circular in shape at their outer periphery 30, 31 and roughly triangularly serrated at their inner side 32 and 33, respectively. In these embodiments, again, the shutoff elements are disposed with a clearance space 34, 35 relative to one another when in the pivoted position of 0° relative to the longitudinal axis (FIG. 17 and FIG. 18), but if necessary they can also be disposed with no clearance relative to one another in this pivoted position of 0° relative to the longitudinal axis of conveying pipe 2.

In each case the reference character 36 identies the free conveying cross section, which can extend on both sides of shutoff elements 4 and 5. The obstructed cross section of relevant conveying pipe 2 is formed in each case by the projected area of shutoff elements 4 and 5 as measured in the flow direction.

The features set forth in the Abstract, the Claims and the Specification as well as those that can be seen in the Drawings can be essential, both individually and also in arbitrary combinations, to the implementation of the invention.

LIST OF REFERENCE CHARACTERS

1 Coal pulverizer
2 Conveying pipe
3 Apparatus
4 Shutoff element
5 Shutoff element
6 Drive, motor
7 Shaft
8 Gearing
9 Bearing
10 Shaft
11 Shaft
12 Drive, motor
13 Drive, motor
14 Drive, motor
15 Drive, motor
16 Shaft
17 Shaft
18 Gearing
19 Gearing
20 Bearing
21 Bearing
22 Periphery, outer
23 Periphery, outer
24 Periphery, inner
25 Periphery, inner
26 Periphery, outer
27 Periphery, outer
28 Inner side
29 Inner side
30 Periphery, outer
31 Periphery, outer
32 Side, inner
33 Side, inner
34 Clearance gap
35 Clearance gap
36 Conveying cross section, free

The invention claimed is:

1. An apparatus for controlling or regulating the distribution of particles in dust or granule form in carrier gas stream transportable in a conveying pipe of arbitrary cross section from a particle source, comprising at least one device capable of being controlled or regulated in various shutoff positions and thus influencing the carrier gas stream being associated with the conveying pipe, each device comprising a plurality of shutoff elements synchronously oppositely or individually pivotable about respective pivot axes extending substantially perpendicularly to a longitudinal axis of the conveying pipe between at least a first position not inclined with respect to a plane perpendicular to the longitudinal axis of the conveying pipe and a second position parallel to the longitudinal axis of the conveying pipe, wherein the shutoff elements together have, in their first positions, a ring shape with their outer peripheries adapted to the inner outline of the conveying pipe such that their outer peripheries lie substantially against the inner wall of the conveying pipe and their inner peripheries delimit between them a tubular free conveying cross section smaller than the cross-section of the conveying pipe, wherein, in their second positions, the shutoff elements are parallel to one another in the diametral region or have respective major surfaces lying flat against one another, and wherein each of the shutoff elements exhibits, in cross section, an airfoil shape having a first leading rounded edge facing the direction of flow of the carrier gas stream at least in the second position and a second trailing edge opposite the leading edge having a sharper profile than the first leading rounded edge.

2. The apparatus of claim 1, wherein the shutoff elements are disposed in continuously pivotable fashion and can be immobilized in each pivoted position.

3. The apparatus of claim 1, wherein the conveying pipe has a circular cross-section and the shutoff elements are fashioned as circular arcs at their outer and inner periphery.

4. The apparatus of claim 1, wherein the conveying pipe has a circular cross-section and the shutoff elements are shaped as circular arcs at their outer periphery and are polygonal at the inner periphery.

5. The apparatus of claim 4, wherein the shutoff elements are fashioned with sharp-edged serrations—in star shape—at their inner boundary.

6. The apparatus of claim 4, wherein the shutoff elements have triangular shapes, rounded with large radii, at their inner periphery.

7. The apparatus of claim 1, wherein shutoff elements offset by an angle relative to one another are disposed one behind another in the axial direction of the conveying pipe.

8. The apparatus of claim 7, wherein two devices having shutoff elements- are disposed one behind another in the axial direction, spaced apart and offset by 90° relative to one another.

9. The apparatus of claim 1, wherein the shutoff elements are angularly adjustable and immobilizable by motor means.

10. The apparatus of claim 1, wherein the shutoff elements are jointly angularly adjustable by a motor drive.

11. The apparatus of claim 1, wherein the pivoted position of the shutoff elements is capable of being controlled or regulated in accordance with the distribution of dust particles or granular material as viewed over the cross section of the conveying pipe.

12. Use of an apparatus in a conveying pipe in which carrier gases or transport gases are transportable, comprising providing the apparatus according to claim 1 in the conveying pipe, transporting particles in dust or granule form in the carrier gases or transport gases through the conveying pipe, and controlling or regulating the shutoff elements in various positions thereby influencing the stream of particles in dust or granule form in the carrier gases or transport gases being transported through the conveying pipe.

* * * * *